United States Patent [19]

Brook et al.

[11] 4,021,336

[45] May 3, 1977

[54] GRADING APPARATUS

[75] Inventors: Richard Morley Brook; Eric Elliot, both of Huddersfield, England

[73] Assignee: AutoSystems Limited, Huddersfield, England

[22] Filed: Jan. 28, 1976

[21] Appl. No.: 652,960

[52] U.S. Cl. .............................. 209/74 M; 209/75; 209/121

[51] Int. Cl.[2] ..................... B65G 47/34; B07C 5/16

[58] Field of Search ............ 209/121, 74, 74 M, 75, 209/125; 177/52

[56] References Cited

UNITED STATES PATENTS

| | | | |
|---|---|---|---|
| 3,306,442 | 2/1967 | Devol | 209/121 |
| 3,627,127 | 12/1971 | Whiteford | 209/121 |
| 3,923,158 | 12/1975 | Fornaa | 209/75 |

*Primary Examiner*—Allen N. Knowles
*Attorney, Agent, or Firm*—John C. Smith, Jr.

[57] ABSTRACT

Grading apparatus is provided for use in associating one of a plurality of a grade with each of a plurality of articles travelling in succession along a feed path. The apparatus comprises a grading station of sufficient length to accommodate at least two articles at any one time, a control unit, and at least two means of feeding a grading signal to the control unit. Although the same amount of work is involved it is easier for an operator to grade say four articles at a time over a distance of say 2 feet, rather than to grade one article at a time over a distance of 6 inches.

16 Claims, 6 Drawing Figures

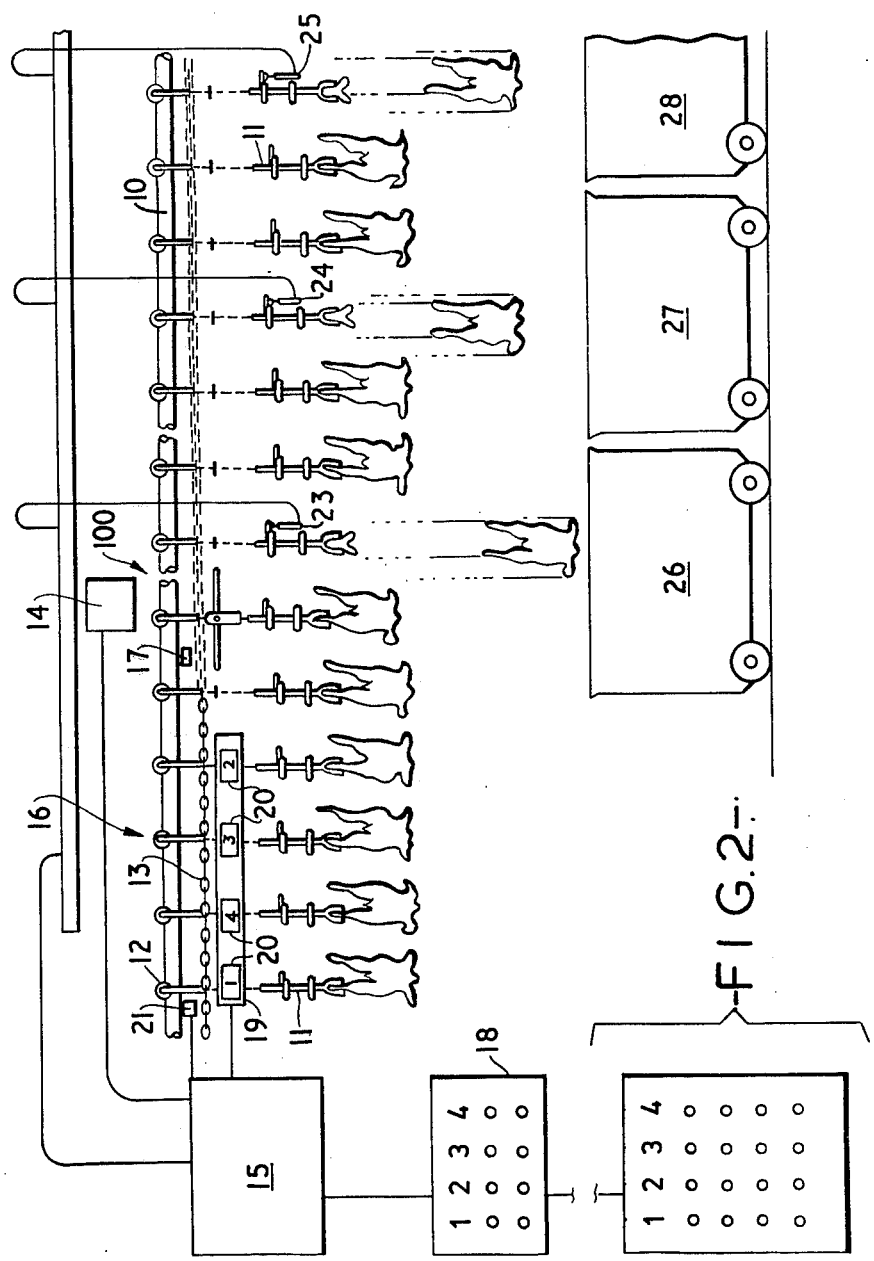

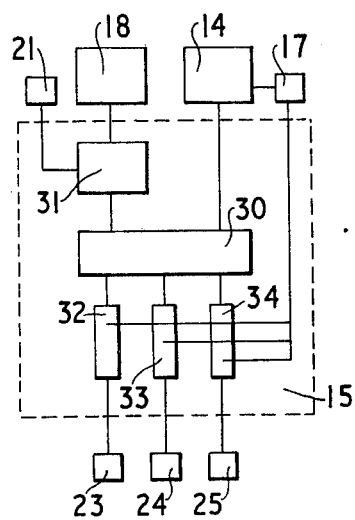
-FIG.3.-
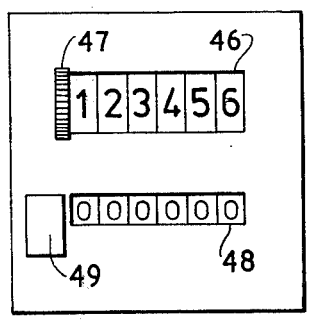
-FIG.5.-
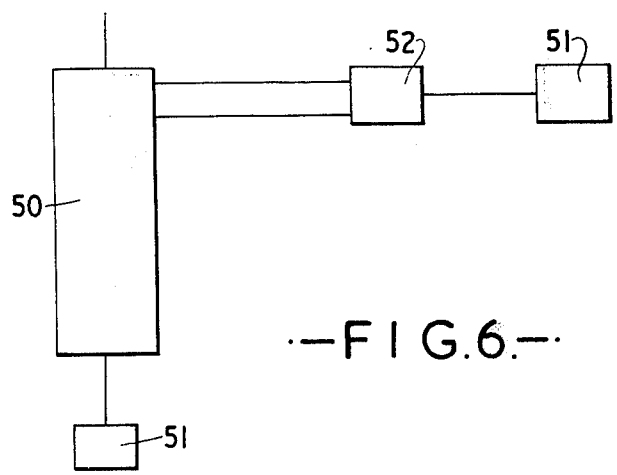
-FIG.6.-

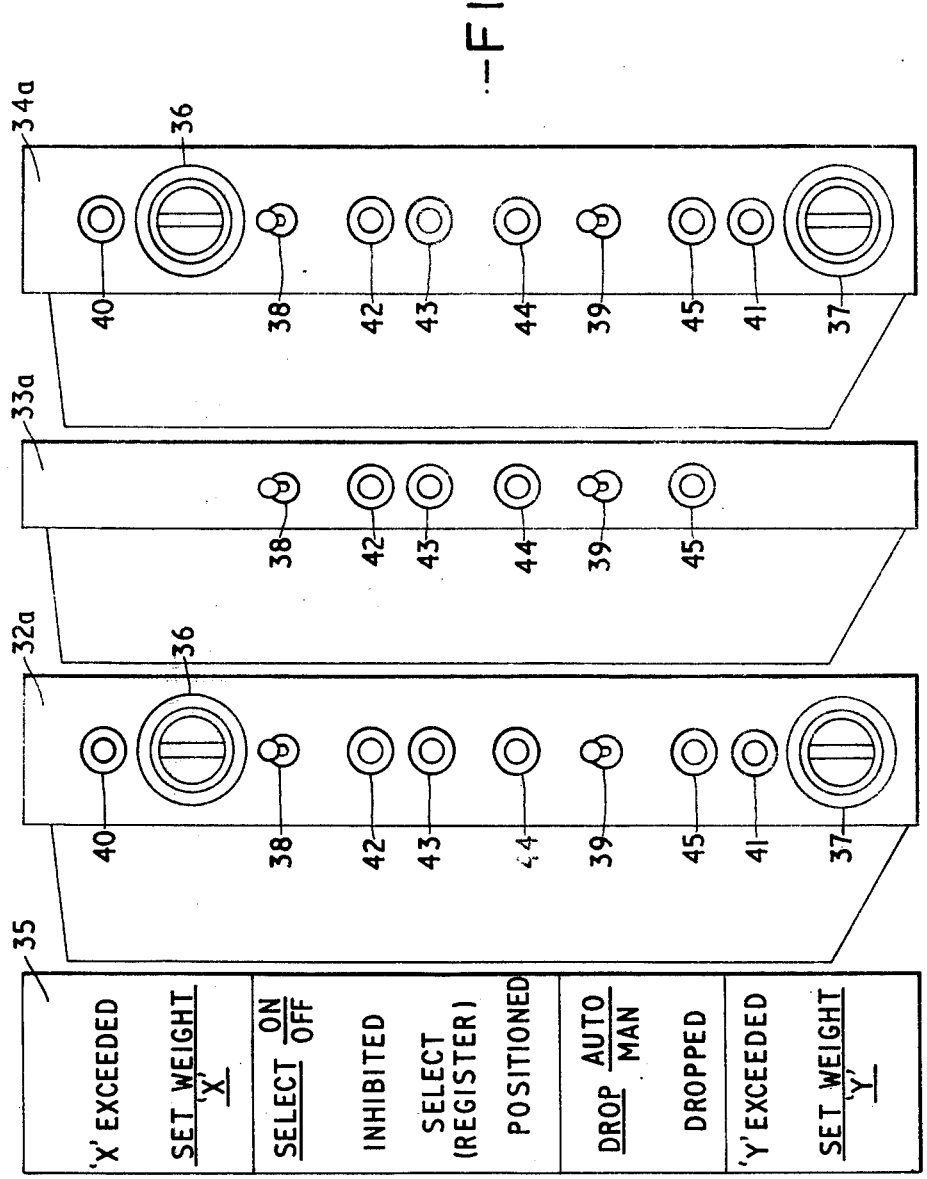

GRADING APPARATUS

BACKGROUND TO THE INVENTION

The invention relates to the grading of articles, e.g. poultry carcasses, and particularly to the grading of a succession of articles travelling along a feed path.

DESCRIPTION OF THE PRIOR ART

In the manufacture or processing of articles, it is frequently desirable to be able to inspect articles as they travel in succession along a feed path, and to allocate to each article a grade according to some predetermined requirement, subsequent processing or handling of each article being dependent upon the grade allocated to the particular article. For example, articles identified as sub-standard may be subsequently fed to a reject station while satisfactory articles are fed to a packaging station.

Our co-pending application Ser. No. 495,016 now U.S. Pat. No. 3,997,013, describes apparatus in which articles are graded by weight, the information is stored in a memory, and is utilised subsequently. In some circumstances however it may be necessary or desirable for grading to be carried out visually by an operator, the operator then feeding into control apparatus a grading signal which he selects according to the state of each article which he sees. He may for example have two control buttons, one initiating a sub-standard signal and one a satisfactory signal, and he presses whichever button is appropriate for each article passing an inspection station. The appropriate grade for each article is then memorised by the apparatus for use in subsequent operations.

Difficulties can arise where the articles are very close together (e.g. only 6 inches apart as may occur on a poultry carcass conveyor) because by the time the operator has selected the grade appropriate to a particular article, the article may have left the inspection station, and been replaced by the next article. If the operator presses the appropriate button for the first mentioned article, the signal will in fact be associated with the next article. In many applications it may be inconvenient or impossible to increase the spacing to avoid the above problem. Conveyor equipment is often designed to convey articles with a fixed spacing between them, and even if it is possible to increase the spacing, this reduces the throughput of articles over a given period of time and hence reduces production.

OBJECTS OF THE INVENTION

It is an object of the invention to provide grading apparatus which readily enables an operator to grade articles passing along a feed path, even when the articles are very close together.

It is a further object of the invention to provide grading apparatus which can grade articles by weight, or be arranged in combination with weighing apparatus, which grading apparatus produces a flexible system which can be readily altered to suit particular requirements.

SUMMARY OF THE INVENTION

The invention provides grading apparatus for use in associating one of a plurality of grades with each of a plurality of articles travelling in succession along a feed path, comprising a grading station of sufficient length to accommodate at least two articles at any one time, a control unit, and at least two means for feeding a grading signal to the control unit. We have found that although the same amount of work is involved, an operator finds it easier to grade say four articles at a time over a distance of say 2-feet, and initiate appropriate signals, than it is to grade one article at a time over a distance of say 6 inches.

Each means for feeding a grading signal is associated by the operator with one particular article of a group which he is grading. For example, if the grading station can accommodate two articles at a time and there are two means for feeding a grading signal, the operator will actuate one feed means when he has graded the first of a pair, and the second feed means when he has graded the second of a pair. When the first of the next pair of articles enters the grading station, he can actuate the first feed means again.

To further assist the operator there may be provided indicating means to indicate to the operator which of a group of articles at the grading station is associated with which feed means. For example the feed means may be numbered and there may be means to display associated members on or adjacent to the articles at the grading station. Alternatively the feed means may be identified by colour, there being means to associate with each colour with one of the articles at the grading station.

BRIEF DESCRIPTION OF THE DRAWINGS

FIG. 1 is a view of one embodiment of apparatus according to the invention;

FIG. 2 is an alternative form of grading console;

FIG. 3 is a schematic diagram indicating an alternative arrangement for the apparatus;

FIG. 4 illustrates in more detail some part of the control unit shown in FIG. 3;

FIGS. 5 and 6 illustrate some further parts which may be added to the control unit.

DESCRIPTION OF EMBODIMENTS OF THE INVENTION

Referring first to FIG. 1, there is shown a rail 10 carrying a succession of chicken carcass-carrying shackles 11, each shackle runs on rollers 12 and the shackles are interconnected by a driving chain 13. The spacing between successive shackles is 6 inches. At a weighing station 100 a weigh cell 14 feeds to a control unit 15 a weight signal each time a shackle passes through the weighing station. The control unit associates each signal with the appropriate shackle and utilises the signal in subsequent control of the shackle. For example all carcasses lying in a particular weight range may be dropped off their shackles into a particular recovery bin. The operation of the weigh cell is as described in application Ser. No. 495,016 and will not therefore be described in detail.

The weigh cell 14 makes an almost instantaneous assessment of the shackle weight and hence it is immaterial that the carcasses are so close together. The weigh cell is able to pass each signal to the control unit well before the next carcass reaches the weigh station. Each signal is fed into a shift register in the control unit and as the next carcass enters the weighing station it actuates a proximity sensor 17 which indexes the shift register one position ready to receive the next weight signal. The proximity sensor 17 also allows the weigh cell to pass the next weight signal to the shift register when the following carcass is at the optimum position in relation to the weigh cell. The sensor opens a gating device in the control unit when a shackle passes the sensor and the sensor is positioned so that when a shackle is at the sensor the following shackle is at the optimum weighing position.

Upstream of the weighing station is a grading station 16 where an operator visually assesses the carcasses and grades them as sub-standard or satisfactory. We have found that it is difficult for the operator to make a decision about a carcass and transmit an appropriate signal in the time which it takes a carcass to travel 6 inches and thus the grading station cannot operate efficiently if it is similarly arranged to the weighing station. Instead, the grading station is of sufficient length to accommodate four carcasses at once, and the operator has a grading console 18 which has four pairs of buttons, each pair numbered 1 to 4. Below the chain 13, and extending for the length of the grading station, is a display unit 19 which has four panels 20 each comprising an electronic display capable of displaying any number from 1 to 4. Each display has a counter associatedtherewith, the counters being coupled to a proximity sensor 21 and being out of phase with each other in such a way that when a first group of four shackles is at the grading station the display unit shows the numbers 1 to 4 in sequence below the associated shackles. In the position shown in FIG. 1, the first shackle of a group has just left the grading station and the first shackle of a new group of four has just entered. The counters have indexed accordingly and the first shackle of the new group has been allocated the number 1. Thus as each shackle enters the grading station it is allocated a number from 1 to 4 and as the shackle moves through the grading station the allocated number appears to follow it across the display panel. Thus the operator is able to associate one particular number from 1 to 4 with any given shackle which is at the grading station at any one time.

A further shift register in the control unit 15 is associated with the grading operation and has four separate inputs, one linked to each pair of buttons on the grading console 18. For any one position of the shift register it can receive four separate grading signals, one at each input, in any order, and will store these signals in an order which depends on the pair of buttons to which the input is linked. The signal from the buttons marked 1 will be stored first, and so on up to the number 4. For every fourth pulse from the proximity sensor 21, the shift register shifts to a new position ready to receive a further set of four signals.

All the operator need do is examine each carcass as it enters the grading station, allocate a grade to the carcass, note the number displayed under the carcass, and then press the appropriate button of the pair having the same number as the carcass. Although he must grade four carcasses over a distance of 2 feet, this has been found to be easier than grading one carcass over a distance of 6 inches.

Downstream of the weighing station are three drop-off mechanisms 23, 24 and 25, each associated with a respective receiving bin 26, 27 and 28. On receipt of an appropriate signal from the control unit 15, each drop-off unit is operable to release the particular shackle which is at the drop-off mechanism when the signal is received, so that any carcass carried by the shackle falls into the bin below.

In this particular example the control unit is programmed to drop all sub-standard carcasses into bin 26 and to sort satisfactory carcasses into two weight ranges, one to be deposited in bin 27 and one to be deposited in bin 28. The control unit is arranged to monitor the signals appearing at a particular point in the shift register associated with the grading signals, the point being as many steps apart from the first section of the shift register as there are shackles between the drop-off mechanism 23 and the grading station. Thus the information appearing at the monitored point relates to the shackle which is at that moment at the drop-off mechanism 23. If the information indicates a sub-standard carcass, the control unit causes the drop-off mechanism to release the carcass. If the information indicates a satisfactory carcass, no signal is passed to the drop-off mechanism.

The control unit similarly monitors other points in the shift register associated with the weighing station, and carcasses are dropped into bin 27 and bin 28 according to their weight.

The information supplied to the control unit 15 may be utilised in a variety of other ways. For example there may be drop-off points where a particular weight range is required, and a certain grade or grades of carcass are acceptable, while another grade or grades are not. In such a case an arrangement as shown in FIG. 3 may be used, in which the control unit 15 comprises a control and inhibition unit 30, a grading shift register 31, and a plurality of weight shift registers 32, 33, 34. Each of the registers 32, 33, 34 is associated with one particular drop-off mechanism 23, 24, 25. The number of sections in the grading shift register 31 is related to the number of shackles lying between the grading station and the weighing station such that the grading information stored in the last section of the shift register 31 relates to the shackle which is being weighed by the weigh cell 14. The control and inhibition unit 30 draws a grading information signal from the last section of the shift register 31 half a pitch ahead of the weight signal received from the weigh cell 14. The weight signal is fed to all three weight shift registers 32, 33, 34 but the unit 30 inhibits from accepting the weight signal any weight shift register which is associated with a drop-off mechanism which does not require that grade of bird. If more than one of the shift registers 32, 33, 34 is associated with a drop-off mechanism which does require the grade of bird indicated, then one of the shift registers will inhibit the other or others, and the weight signal will only be stored by that one shift register. The shift register with priority may simply be the first one in the line, or may be given priority by an additional device such as those described later.

Thus weight information about any one carcass is stored in only one shift register, and is stepped through the register by subsequent pulses from the sensor 17.

Each register 32, 33, 34 is set to receive only signals lying within a particular weight range so even if a register is associated with the grade indicated and is not inhibited, it will not accept a signal lying outside its own selected weight range.

Each register 32, 33, 34 has a number of sections related to the number of shackles lying between the weigh cell 14 and the associated drop-off mechanism so that the signal relating to a particular carcass will reach the final section of the shift register at the same time as the carcass reaches the drop-off mechanism. The signal appearing in the final section causes actuation of the mechanism and the carcass falls into a bin associated with the particular grade and weight of that carcass.

The parts of the control unit comprise modular units which can be plugged together to provide various grading and weighing systems. FIG. 4 illustrates three modules 32a, 33a, and 34a together with an associated legend panel 35. These units are intended to plug into a control and inhibition unit side by side. Module 32a has two potentiometer dials 36 and 37 which are used to set the lower and upper limits of a weight range respectively. If dial 36 were set to 2 pounds for example, and dial 37 were set to 5 pounds, then the shift register forming part of the module would accept a weight signal initiated by a carcass weighing between 2 and 5 pounds, provided that the register is not inhibited by the grading information or by one of the other modules described below.

The module 32a has an on/off switch 38 and a second switch 39 to couple the module to the associated drop-off mechanism. There are lights 40 and 41 to indicate respectively whether the weights set on dials 36 and 37 have been exceeded and lights 42 and 43 to indicate respectively whether the register has accepted a weight signal or been inhibited. There is also a light 44 to indicate that a carcass associated with that module has reached the associated drop-off mechanism and a light 45 which comes on momentarily each time the associated drop-off unit operates.

The module 34a is identical to module 32a and may for example be set to receive signals in a weight range 6 to 8 pounds. The module 33a is also identical except that it has no dials 36 and 37 and no lights 40 and 41. This module will accept any weight signals lying between the two ranges covered by modules 32a and 34a, i.e. lying in the range 5 to 6 pounds.

Since the size of the shift register in each module is fixed, each module is only suitable to operate a drop-off mechanism arranged a predetermined number of shackles away from the weigh cell but the position of the drop-off mechanisms can be adjusted as desired, the associated modules being unplugged from the control unit and replaced by other similar modules having appropriately sized shift registers.

FIG. 5 shows a modular counter which may be coupled to one of the modules 32a to 34a to count the number of carcasses dropped off in the weight range associated by that module. The counter may be arranged to inhibit the further operation of that module after a preselected number of carcasses have been dropped off. The desired number is set at 46 using a knurled wheel 47 and when the carcasses counted (indicated at 48) reaches the desired number, an inhibit signal is generated. A visual and/or audible warning may be initiated by the counter when the desired total is reached so that an operator may remove the full bin, replace it with an empty one and then reset the counter so that the associated module is no longer inhibited, by pressing a reset button 49.

FIG. 6 shows a shift register module 50, with an associated drop-off 53, coupled to a device for limiting the rate at which carcasses are dropped off by that module. The limiting device comprises a pulse generator 51 and a counter 52. If a drop off rate of say ten carcasses per minute is required, the generator 51 is set to feed ten pulses per minute to the counter 52. Each pulse causes the counter to increase its count by one. The module 50 is coupled to the counter so that every time the module accepts a weight signal it causes the counter to decrease its count by one. Whenever the counter indicates a total of zero, an inhibit signal is passed to the module 50, preventing it from accepting further signals until the counter increases its count to a positive value.

The invention is not restricted to the details of the foregoing example. For instance it may be desired to grade carcasses into more than two grades, for example "Trim" carcasses (e.g. carcasses which have been trimmed to remove a burn mark left by an electric stunning operation), "Wing missing" carcasses, "Parts missing" carcasses, and "Grade A" carcasses. With such an arrangement a grading console as shown in FIG. 2 may be used, there being four buttons associated with each of the numbers 1 to 4, one button for each grade. If necessary, two or more operators may be used, each dealing with two of the grades or two of each group of four carcasses.

If desired, the display unit 19 may be dispensed with, the shackles being painted different colours, e.g. red, black, green and blue for each group of four shackles, and the grading console 18 being marked red, black, green and blue accordingly, instead of 1, 2, 3 and 4.

In some processes, the weight of the carcasses may be altered after some preliminary processing. For example, after certain weights and grades of carcass have been dropped off, the remaining carcasses may have giblets inserted into them, and it may then be necessary to drop these carcasses off at other points, according to weight and grade. In such a case a further weighing station, similar to that shown in FIG. 1, may be provided at a point downstream of the giblet insertion point. The control unit may be programmed to retain the information from the grading station, but to cancel the original information regarding weight and replace it with the information from the second weighing station, the original grading information and new weight information being utilized to control subsequent processing and handling.

It is an important feature of the invention that the control unit is of modular construction, with plug-in panels, each carrying the necessary logic circuitry associated with one particular operation, for example one particular drop-off point.

We claim:

1. Grading apparatus for use in associating one of a plurality of grades with each of a plurality of articles conveyed in succession along a feed path by conveyor means, the apparatus comprising a grading station of sufficient length along said path to accommodate a group of at least two articles at any one time, a control unit adapted to be connected to said conveyor means, and a plurality of means for feeding a grading signal to the control unit, the number of feed means being equal to the number of articles which can be accommodated at the grading station.

2. Grading apparatus as claimed in claim 1, in which the control unit comprises at least one memory to store the signals received from the feed means.

3. Grading apparatus as claimed in claim 2, in which the memory comprises a shift register having a plurality of sections, each section of the register having provision to receive a grading signal from each of the feed means and store the signal in the section in the order in which they are received by the section, and the apparatus includes a shift sensor connected to said control unit and which senses the passage of articles past the grading station and indexes the shift register to a new position after the passage of each group of articles, so that a group of grading signals in a first section of the register is transferred to the next section of the register and the first section of the register is ready to receive a new group of grading signals associated with the next group of articles.

4. Grading apparatus as claimed in claim 1, in which there is a grading console having at least two sets of signal initiating means, one set for each article of a group present at the grading station, the apparatus also including means to associate each of said sets with one particular article of the said group.

5. Grading apparatus as claimed in claim 1, in combination with apparatus for weighing the articles, the control unit having means for storage information relating to the grade and weight of the articles.

6. Grading apparatus as claimed in claim 5, in which the control unit has a plurality of shift registers for receiving information regarding the weight of the articles, the shift register which receives information about one particular article being dependent on the grading information stored relating to that particular article.

7. Grading apparatus as claimed in claim 6, in which at least one shift register is arranged in combination with two potentiometers for use in controlling the range of weight information which can be stored in that shift register.

8. Grading apparatus as claimed in claim 6, in which the shift registers are each in the form of a module which can be readily detached from the control unit and be replaced by an alternative module.

9. A conveyor system for transporting poultry carcasses and sorting the carcasses by weight, the system including a control unit for receiving information regarding the weight of the carcasses and actuating sorting devices in dependence upon the weight information, the control unit having a plurality of replaceable modular components, a first of said modular components comprising means for receiving information regarding the weight of a carcass lying within a first preselected weight range, said first modular component having means for preselecting the upper and lower limits of said first weight range.

10. A system for transporting and sorting poultry carcasses comprising an overhead conveyor system, a control unit, a grading station, means for feeding information into the control unit regarding the grade of carcass at the grading station, means for storing the information in the control unit, a weighing station, means for feeding into the control unit information regarding the weight of carcasses as they pass through the weighing station, and a plurality of shift registers each associated with a drop-off mechanism, one of which receives a signal relating to one particular carcass, dependent on the grading information and weight information received by the control unit, and actuates the associated drop-off mechanism to remove the particular carcass from the conveyor when the particular carcass reaches the drop-off mechanism.

11. A conveyor system as claimed in claim 9, further comprising a second modular component comprising means for receiving information regarding the weight of a carcass lying within a second preselected weight range, the component having means for preselecting the upper and lower limits of said second weight range.

12. A conveyor system as claimed in claim 11, further comprising a third modular component comprising means for receiving information regarding the weight of a carcass lying within a third weight range, the upper limit of the third weight range being defined by the lower limit of the first weight range an the lower limit of the third weight range being defined by the upper limit of the second weight range.

13. A conveyor system as claimed in claim 9, including means to temporarily and selectively inhibit said means for receiving information regarding the weight of a carcass lying within said first preselected weight range, so that a weight information signal generated by a particular carcass is not passed to said means for receiving information.

14. A conveyor system as claimed in claim 13, in which a further of said modular components comprises a counter connected to said first modular component, and means to preselect a number on the counter, the counter being arranged to inhibit the first modular component from receiving any further weight signals once it has received a number of weight signals equal to the number preselected on the counter.

15. A conveyor system as claimed in claim 13, in which a further of said modular components comprises a pulse generator in combination with a counter, the pulse generator being arranged to clock the counter in one direction and said first modular component being arranged to clock the counter in the opposite direction each time the modular component receives a weight signal, the counter being arranged to inhibit said first modular component from receiving weight signals so long as the count on the counter is at a zero datum level.

16. A conveyor system as claimed in claim 11, in which said first modular component comprises a first shift register, and said second modular component comprises a second shift register having a different number of sections than said first shift register.

* * * * *